United States Patent [19]

Pollock

[11] 3,930,827

[45] Jan. 6, 1976

[54] METHOD AND APPARATUS FOR STABILIZING MOVEMENT OF GLASS DURING ITS ADVANCE ALONG A MOLTEN METAL SURFACE

[75] Inventor: E. Kears Pollock, Allison Park, Pa.

[73] Assignee: PPG Industries, Inc., Pittsburgh, Pa.

[22] Filed: Oct. 15, 1974

[21] Appl. No.: 514,978

[52] U.S. Cl................ 65/65 A; 65/99 A; 65/182 R
[51] Int. Cl.² ......................................... C03B 18/02
[58] Field of Search............... 65/65 A, 99 A, 182 R

[56] References Cited
UNITED STATES PATENTS

| | | | |
|---|---|---|---|
| 3,223,509 | 12/1965 | Barradell-Smith et al...... | 65/65 A X |
| 3,333,936 | 8/1967 | Warren........................... | 65/65 A X |
| 3,533,773 | 10/1970 | Fujimoto et al................ | 65/65 A X |

*Primary Examiner*—Arthur D. Kellogg
*Attorney, Agent, or Firm*—E. Kears Pollock

[57] ABSTRACT

Marginal edge portions of an advancing layer or sheet of glass supported on molten metal are selectively heated or cooled by direct radiant and convective heat transfer in order to control the alignment of the glass along a preselected path of advance. In a process wherein molten glass is delivered substantially horizontally onto the molten metal, the depth of molten metal beneath the glass is made to differ across the width of the glass layer transverse to the intended path of glass advance to further provide for stabilizing the alignment of the advancing glass through controlled heat transfer between the glass and the supporting molten metal.

26 Claims, 9 Drawing Figures

METHOD AND APPARATUS FOR STABILIZING MOVEMENT OF GLASS DURING ITS ADVANCE ALONG A MOLTEN METAL SURFACE

BACKGROUND OF THE INVENTION

1. Field of the Invention

This invention relates to a method and apparatus for the manufacture of a continuous sheet of flat glass by supporting molten glass on a pool of molten metal and advancing it along the surface of the pool of molten metal while cooling it to form a continuous sheet of flat glass. More particularly, this invention relates to a method for selectively adjusting and maintaining the condition of the glass at different locations across its width to stabilize the path of movement of the glass as it advances along the surface of the pool of molten metal.

2. Description of the Prior Art

Flat glass may be produced in many different ways. Several methods have been disclosed in the past which involve floating or supporting glass on the surface of a pool of molten metal as it is advanced along that surface and cooled to form a continuous sheet of flat glass. For example, molten glass may be delivered onto a pool of molten metal and formed into a continuous sheet or ribbon of glass according to the teachings of Heal, U.S. Pat. No. 710,357 or of Hitchcock, U.S. Pat. No. 789,911 or according to the methods disclosed in the patents of Pilkington, U.S. Pat. No. 3,083,551 and U.S. Pat. No. 3,220,816 or according to the teachings of Edge and Kunkle found in U.S. Pat. No. 3,843,346. These patents describe processes in which molten glass delivery techniques vary, yet they share the common disclosure that a continuous sheet of flat glass may be formed by advancing a layer of glass along the surface of a pool of molten metal while cooling the glass until it assumes a final width and thickness as a dimensionally stable, continuous sheet of glass.

In the method of Heal, molten glass is delivered over a refractory bridge and then flows slightly downwardly onto the surface of a pool of molten metal confined between two side walls of a forming chamber. This layer of glass advances along the surface of the pool of molten metal between the side walls and remains in contact with them as it is advanced and cooled to form a dimensionally stable, continuous sheet of glass. In the method of Hitchcock, molten glass is delivered through a slot in a refractory wall and flows horizontally onto the surface of a pool of molten metal in a forming chamber. The glass advances along the surface of the pool of molten metal as a layer of constant width and is cooled and advanced at a sufficient speed to form a dimensionally stable, continuous sheet of glass of desired thickness. In the method described by Pilkington, molten glass is delivered through a long, narrow canal and over a refractory lip and then falls freely downwardly onto the surface of a pool of molten metal. It then spreads laterally, outwardly and rearwardly in an unhindered fashion. An advancing layer of glass is drawn along the surface of the pool of molten metal from this laterally, outwardly moving body of molten glass. This layer of glass is advanced as its width diminishes and as it is cooled to form a dimensionally stable, continuous sheet of glass of desired thickness and width. In the method disclosed by Edge and Kunkle, molten glass in a pool of molten glass is conditioned to establish a region of forward flow near its surface, and this forwardly flowing glass is delivered over a threshold member substantially horizontally onto the surface of a pool of molten metal maintained at or near the elevation of the threshold over which the glass is delivered. This flowing molten glass is advanced along the surface of the pool of molten metal as it is initially cooled either having its marginal edges free of contact with side members or having them in contact with selected side members for a short distance. The glass is thereafter advanced along the surface of the pool of molten metal while being further cooled to form a dimensionally stable, continuous sheet of glass. In the method of Heal and the embodiment of the method of Edge and Kunkle wherein the marginal edge portions of the advancing layer of glass in the forming chamber are in contact with side walls or side members, the alignment of the path of the advancing glass is fixed and invariant. However, in the method described by Hitchcock and the embodiment of the method of Edge and Kunkle wherein extended side members are not employed, the alignment of the path of the advancing glass is not fixed by any mechanical means and may be subject to occasional movement or misalignment. In the practice disclosed by Pilkington, alignment of the path of advance of a layer of glass emanating from a spreading body or pool of glass beneath a lip from which molten glass is poured is easily varied since there is neither a physical barrier resisting its movement, nor any directed forward flow within the body of glass which is aligned with the intended path for advancing the layer of glass as it is formed into a continuous sheet of glass. Consequently, in the practice of the method disclosed by Pilkington, instability of the glass position and alignment is persistent. This persistent tendency to become misaligned is characterized as "drifting" or "snaking" of the glass. As indicated, it is a persistent and chronic problem. In the practice disclosed by Hitchcock and in that disclosed by Edge and Kunkle, there is considerably less tendency for the advancing glass to drift from its intended path of advance but some drifting may from time to time occur even in those processes.

Certain solutions to the problem of glass drifting or snaking have been proposed by Barradell-Smith et al. in U.S. Pat. Nos. 3,223,503 and 3,223,509. Methods and apparatus are disclosed in these patents for steering and advancing layer or ribbon of glass on a pool of molten metal in the forming chamber. Disclosed in these patents are a method and apparatus for creating surface movement in the supporting molten metal of a forming chamber so that the movement of molten metal in contact with the undersurface of the glass will act upon the bottom surface of the glass to move the glass. The flow of molten metal within the pool of molten metal may be established using coolers disposed in the molten metal at some location adjacent to the edge of an advancing layer of glass or remote from it to establish thermally induced convection flows. The flow of molten metal may be established using electromagnetic forces from a linear induction motor, such as disclosed by Butler in U.S. Pat. No. 3,453,460. In using the apparatus described in these patents to carry out the methods described in them, the conditions within the supporting molten metal are first altered. These conditions are employed to cause flows in the molten metal beneath the glass supported on it, and these flows then are caused to impose steering forces to the glass itself. Because of this long chain of interactions, the glass responds somewhat sluggishly to changes in the controlled steering devices whether they be linear-induction motors or coolers.

A variety of devices have been disclosed in the art for stabilizing the position of an advancing layer of glass through a forming chamber which involve physically or mechanically engaging a marginal edge portion or both marginal edge portions of the advancing layer, ribbon or sheet of glass, depending upon the location in the forming chamber along the path of advance in which such contact is made. Representative patents disclosing such mechanical steering or ribbon stabilizing devices and methods are as follows: U.S. Pat. No. 3,528,795 to Swillinger shows cooled edge-engaging guide members located on one side of an advancing layer of glass in a forming chamber, particularly in the upstream region of the forming chamber. U.S. Pat. No. 3,506,428 to Itakura shows a device including edge-engaging members for contacting both marginal edges of a continuous sheet of glass that has already been removed from a forming chamber. This device can align a continuous sheet of glass after it is formed but is ineffective to prevent "snaking" or sideward movement of the advancing glass in the forming chamber. U.S. Pat. No. 3,326,653 to de Lajarte et al. shows a method for inserting a flexible, heat-resistant material into each marginal edge portion of an advancing layer of glass, maintaining these in contact with the glass during its cooling and formation as a continuous ribbon of glass and thereafter removing them. U.S. Pat. No. 3,353,943 to Loutte illustrates edge rolls or discs for contacting both marginal edge portions of an advancing layer of glass in the forming chamber and for mechanically maintaining it in a predetermined position.

Functionally, of course, all of the mechanical devices for maintaining the alignment of a continuous sheet or layer of glass advancing along the surface of a pool of molten metal in the forming chamber resist the transverse, lateral movement of the glass in the same general way as do the side walls of the glass forming chamber of Heal. These all provide a positive and direct steering and stabilizing action upon the glass itself, but they typically mark or damage the marginal edge portions of the glass directly due to surface contact or because of the development of optical distortion in the marginal edge portion of the glass due to the drag imposed by the stationary edge-contacting devices acting upon the flowing glass. The steering methods and apparatus of Barradell-Smith et al., on the other hand, do not appear to cause any marking of the marginal edge portions of a continuous sheet of glass, but these methods and apparatus do not provide for rapid and efficient response to variations in glass alignment caused by varying conditions within the glass as it is delivered to the surface of a pool of molten metal.

The present invention provides a method and apparatus for steering and stabilizing an advancing layer or ribbon of glass supported on molten metal in a forming chamber without marking the marginal edge portions of the glass or causing them to develop optical distortion characteristics. The present method and apparatus provide for rapid and efficient response to any intermittent movement of the glass from its intended path of advance.

This invention is practiced in combination with and as an improvement to flat glassmaking processes in which the glass is formed on molten metal. In this process a continuous sheet of flat glass is produced by a method including the following steps: A layer of molten glass is delivered onto the surface of a pool of molten metal maintained within a forming chamber. The molten metal is preferably tin, an alloy of tin or some other metal having a specific gravity greater than the glass and having a melting point lower than the glass to be formed while being substantially nonreactive to the glass at its melting temperature. The layer of molten glass is advanced along the surface of the pool of molten metal and is cooled during such advance to form a dimensionally stable, continuous sheet of glass.

Forces are applied to the glass while it is advanced along the surface of the pool of molten metal. Forces are applied to the glass which are aligned substantially along its path to cause it to be advanced. These forces may be sufficient to cause the glass to be attenuated to a thickness less than an equilibrium thickness during its advance. These forces are characterized as longitudinal tractive forces and may be applied to the glass at any location along the length of the glass sheet. They are preferably applied to the glass at locations well along its path of advance, preferably beyond the supporting pool of molten metal, and are transferred to the hot or more fluid glass primarily due to the surface tension of the glass. Other forces may be applied to the glass in a manner such that they are aligned substantially across or transverse to the path of glass advance. These forces are characterized as transverse forces. The resultant forces caused by the application of the described forces in combination with the reactive surface tension and gravity forces acting on the glass cause the glass to be formed into a continuous, flat sheet of desired thickness.

After the glass has been cooled sufficiently to become dimensionally stable (that is, if it has reached its final width and thickness) it is advanced farther along the surface of molten metal and then is lifted from the surface of the pool of molten metal and conveyed from the forming chamber. It may be lifted slightly and conveyed along a substantially horizontal path from the forming chamber, or it may be lifted and conveyed upwardly from the pool of molten metal in the manner described by Gerald E. Kunkle in his copending, commonly assigned patent application, Ser. No. 483,508, filed June 27, 1974, which is incorporated by reference herein. The glass is cooled sufficiently prior to lifting it from the surface of the pool of molten metal so that its width and thickness remain unchanged during lifting and conveyance from the forming chamber.

As the glass is being formed during its advance along the surface of the pool of molten metal and as it is conveyed from the pool of molten metal, it is controllably cooled. The cooling is coordinated with the rate of glass advance to form a continuous sheet of glass of desired width and thickness. If the layer of glass is permitted initially to spread laterally outwardly in an unhindered manner, the cooling and rate of glass advance are advantageously coordinated to simultaneously attenuate the thickness and the width of the glass in the manner disclosed by Charnock in U.S. Pat. No. 3,352,657 and by Dickinson et al. in U.S. Pat. No. 3,695,859. Nevertheless, a preferred practice involves maintenance of the width of the glass equal to or less than the width of the initially delivered layer of glass for this in and of itself helps to stabilize the path of advance of the glass.

During the advance of the glass along the surface of the pool of molten metal, its path of advance is maintained by practicing this invention.

SUMMARY OF THE INVENTION

The temperature of at least one, and preferably the temperatures of both marginal edge portions (preferably about one-tenth of the full width of the glass layer or sheet as the case may be) of the glass are individually subjected to temperature control by separately heating or cooling them. This selective temperature control is effective to steer the glass along a preselected or desired path of advance usually parallel to the forming chamber side walls with the advancing glass centered with the centerline of the chamber extending from the upstream inlet end of the chamber to the downstream or outlet end of the chamber.

The temperature control is accomplished primarily by direct radiant heat transfer between the glass and a pair of heaters or coolers (or combination), each positioned in the forming chamber over the glass and extending along one of its marginal edges a sufficient distance to effectively interact with the advancing glass moving beneath it. By acting directly upon the glass, it is possible to guide or steer the glass along a stable path of advance with the glass responding quickly and surely to control actions. This direct control is believed superior to attempts to steer an advancing layer or sheet of glass by first establishing flows in a supporting pool of molten metal beneath a layer of glass and then having the movement of the metal adjacent the undersurface of the glass drag it to a desired path. Due to the limited wetting (friction or adhesion as may be postulated) of glass to tin, which is the common metal employed, movement of an advancing layer of glass in response to movement of the metal beneath it is sluggish.

In the practice of this invention, advantage is taken of the fact that glass, at temperatures typical for forming, is an excellent absorber and radiator of heat having a thermal emissivity which is much greater than the emissivity of molten tin. This invention also takes advantage of the fact that the viscosity of a glass at temperatures in the forming range is highly responsive to and dependent upon the temperature of the glass. Since longitudinal tractive forces acting upon a layer of glass to advance it and to form or attenuate it into a continuous sheet of glass are transmitted through the glass itself due to the surface tension of the glass, it has been discovered that the effectiveness of such force transfer is subject to thermal control. Thus, it is now possible to effectively adjust and maintain the extent of force transfer along one marginal edge portion of the glass independently with respect to adjustment and maintenance of force transfer along the other marginal edge portion of the glass. In this manner the advancing glass may be steered. As a greater force is transmitted to more fluid glass in the upstream portion of a forming chamber the greater that glass tends to accelerate, and at its marginal edge, it then tends to seek a shorter (and, thus, straighter) path of advance. Thus, by transmitting more force through the glass along one marginal edge, it is possible to move that marginal edge into more perfect alignment with the side walls of the forming chamber. For example, if a marginal edge of the glass has drifted or bulged outwardly toward a side wall, the transmission of more longitudinal force to the glass in the region of such bulge or drift will move the glass away from the side wall.

The steering devices of this invention may be located at one or more locations along the length of a forming chamber. Preferably at least one pair of devices is used, and these devices are positioned sufficiently downstream from the location of molten glass delivery so that a developed body or layer of glass exists between the delivery location and the steering devices. It is to the marginal edge portions of this developed body or layer of glass that the longtudinal forces are controllably transmitted. When more than one pair of steering devices are employed, it is possible to cool a first edge more than a second edge at a downstream location while cooling the second edge more than the first edge at an upstream location and to thereby transmit more force to the upstream location along the first edge while making that first edge at the upstream location more susceptible to straightening. This procedure, characterized as "crossover differential cooling (or heating as the case may be)," is effective for providing highly responsive steering or stabilizing of an advancing layer or sheet of glass even in a float process such as disclosed by Pilkington wherein "snaking" or "drifting" is often rather difficult to control. While a plurality of pairs of steering devices may be used, the same effect can be achieved by providing elongated steering devices having separately controllable sections along their lengths.

The present steering devices may be used in combination with the glass edge detection devices shown in U.S. Pat. No. 3,794,477 to Farabaugh and Gulotta. The disclosure of that patent is incorporated by reference herein. Such a combination may be used to automatically control the position of an advancing layer or sheet of glass within a forming chamber.

In another aspect, this invention provides an improved bottom extending beneath the molten metal in a forming chamber, particularly at the upstream or inlet end of a forming chamber wherein the surface of the molten metal is maintained at or near the elevation of a layer of molten glass flowing through a delivery facility connected to the forming chamber. The bottom of a preferred forming chamber provides for a deeper pool of molten metal in the central portion of the chamber than in the marginal portions of the chamber adjacent the side walls. Thus, conductive heat transfer from the glass to the molten metal is enhanced in the central portion of the chamber relative to similar heat transfer in the marginal portions of the chamber. This causes the marginal portions of an advancing layer of glass to lose their fluidity more slowly upstream of the steering devices making them more susceptible to manipulation by transmitted forces. Even in the absence of steering devices, such bottom construction is beneficial in a glass forming apparatus such as described by Edge and Kunkle in U.S. Pat. No. 3,843,346, which is incorporated herein to illustrate an apparatus and process for delivering molten glass along a substantially horizontal path between side wall members or jambs onto a pool of molten metal for forming it into a continuous sheet of glass while supporting it thereon. In that environment a bottom, such as described here, has the particular utility of enhancing the forward flow of glass in the marginal edge portions of an advancing layer of glass relative to the forward flow of glass in the central portion of the advancing layer of glass. This materially assists in further minimization of "herringbone" distortion in the marginal edge portions of a sheet of glass being produced. "Herringbone" distortion is, of course, an optical distortion pattern of repeating angular regions of differing optical thickness along the length (direction of advance) of a continuous sheet of glass.

In a preferred embodiment of this invention, the bottom of a forming chamber immediately downstream of a glass delivery facility is scooped out in its central portion with the depth for a pool of molten metal over the bottom gradually increasing to a maximum depth near the centerline of the chamber. The depth also gradually increases as one moves along the chamber centerline or central portion downstream from the delivery facility. At a convenient distance downstream from the delivery facility, preferably at a location where a delivered layer of glass will reach either an equilibrium thickness or half its delivery thickness, whichever distance is shorter, the bottom of the forming chamber may be flat without adversely affecting the beneficial effects obtained through use of a scooped bottom upstream of that location.

In a particularly preferred embodiment of this invention wherein a layer of glass is delivered along a substantially horizontal path onto a pool of molten metal, the scooped-out, central portion of the forming chamber bottom is preferably in the shape of a truncated paraboloid. Since the thermal conductivity of molten metal is much greater than that of glass and since the heat transfer from the delivered glass to the adjacent molten metal beneath it is directly proportional to the temperature difference between them and consequently directly proportional to the thermal gradients in the molten metal, the differing molten metal thickness serves to balance heat transfer rates across the width of the delivered layer of glass and to favor heat transfer from the glass in the central portion of the layer. Just as conductance is inversely proportional to the cross-sectional area of a conductor so, too, is the rate of heat transfer made to vary across the width of the pool of molten metal. This tends to stabilize the path of advance of the glass. As relatively more heat is removed from the central portion of the advancing glass, longitudinal tractive forces are more effectively transferred along the central portion of the glass. Since any occasional imbalance in transmitted force acts with less leverage on the layer of glass if it acts near the center of the glass than if it acts near a margin of the glass, any relative concentration of transmitted forces along the central portion of the glass, rather than along its marginal edges, tends to stabilize the path of advance of the glass.

This invention will be further understood with reference to the accompanying drawings and the detailed description of the illustrated embodiments which follows.

DESCRIPTION OF THE PREFERRED EMBODIMENTS

Figure 1:
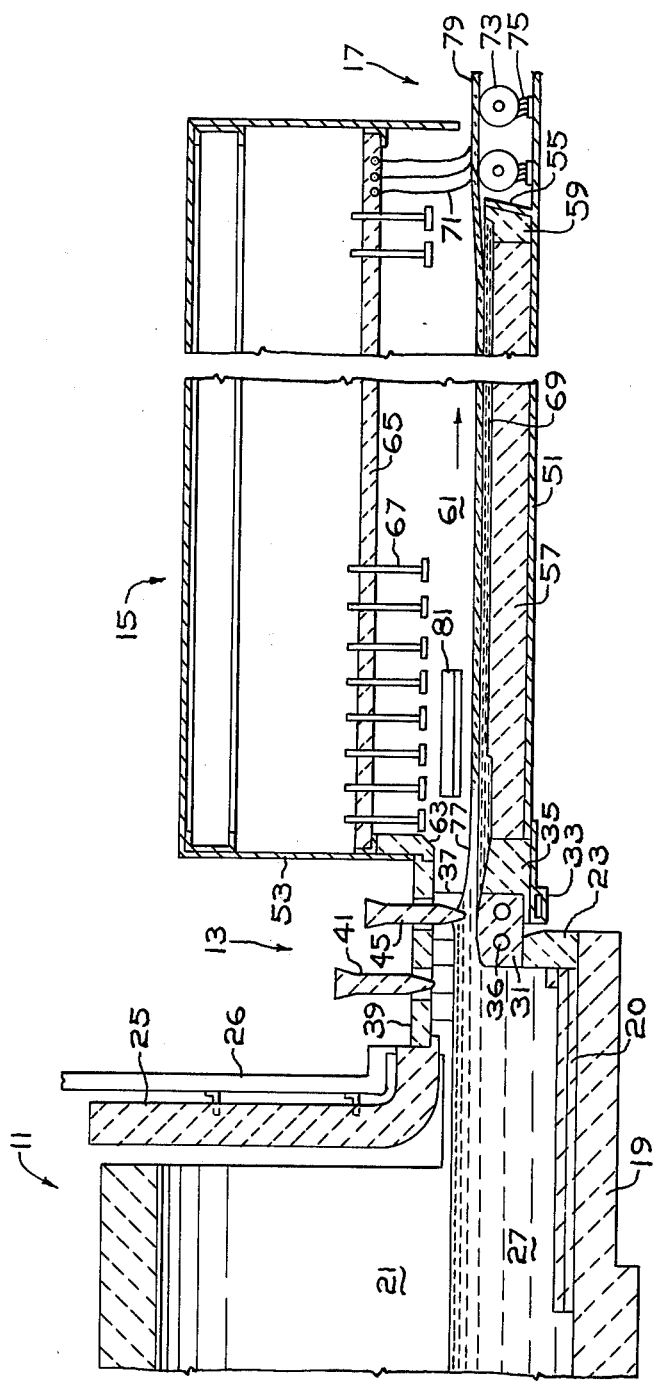
FIG. 1 is a sectional elevation view of an apparatus for producing flat glass in accordance with this invention.
Figure 2:
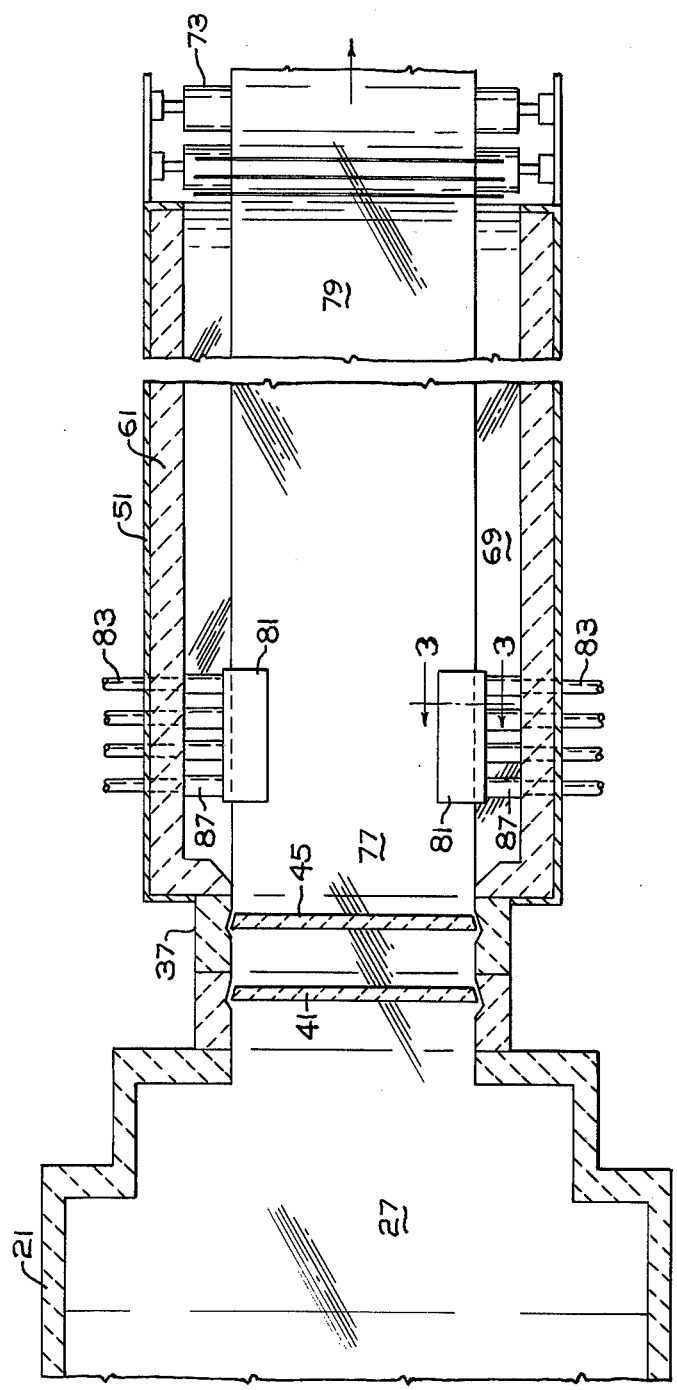
FIG. 2 is a sectional plan view of the apparatus shown in FIG. 1.

Referring now to FIGS. 1 and 2 there is shown a view of a suitable apparatus for carrying out the present invention. The glass-making apparatus comprises a furnace 11, delivery means 13 and a forming chamber 15 and a glass removal facility 17. It will be understood that the lifting and conveying apparatus employed in the practice of this invention may be designed to cause the glass to be conveyed along either a horizontally extending path as shown or along an upwardly extending path.

The glassmaking furnace 11 includes a melting section (not shown) and a refiner or conditioner, the end of which is shown. The refining or conditioning section of the furnace 11 comprises a furnace bottom 19 preferably with a raised section 10, side walls 21 and a front basin wall 23. The furnace further comprises an upper front wall 25 which preferably is suspended or supported from above by a structural support 26 and a roof overlying the upper portion of the furnace.

The delivery means 13 includes a threshold 31 resting on a cooling block 33 or other support. A cast refractory seal 35 or the like is disposed between the threshold 31 and the cooling block 33. Extending through the holes in the threshold are conduits or pipes 36 for transporting coolant or the like through the interior of the threshold 31 and for controlling its temperature during use. At the ends of the threshold 31 there are side wall portions or jambs 37 on the sides of the channel through which molten glass may be delivered from the pool of molten glass 27 residing in the bottom portion of the furnace 11. The top of the delivery means 13 is defined by a roof 39. The roof is preferably a flat arch which is supported by supporting means (not shown) extending above it and connected to flat arch supporters embedded in the flat arch itself. Extending transversely across the delivery means 13 are two gates or tweels. The first tweel is a backup tweel 41 connected to a support assembly (not shown) for raising or lowering it into engagement in the pool of molten glass 27. The second tweel is a control tweel 45 supported by support assembly (not shown) for raising and lowering the tweel. The tweel is held in operating position in contact with the molten glass to be delivered for forming. The control tweel 45, along with the threshold 31 and the jambs 37, defines an opening through which a layer of molten glass may be delivered for forming.

The forming chamber 15 comprises a bottom casing 51. This casing is preferably a casing constructed of metal, such as steel. The casing is preferably impervious to the molten metal in the chamber. The forming chamber 15 further comprises a top casing 53 including a top, ends and side portions. The top casing is also preferably constructed of impervious metal. An end piece or lip casing 55 is disposed across the forming chamber at its downstream end and, connected to the bottom casing 51. Disposed within the bottom casing 51 is a refractory bottom 57, preferably a refractory bottom that has been cast in place inside the bottom casing 51 between the inlet end bottom 35 and an exit lip 59 mounted or cast against the lip casing 55. Preferably embedded within the bottom refractory 57 are pipes such as shown in the copending application of Kunkle which is incorporated by reference herein. Coolant or other fluid may be directed through such pipes for controlling the temperature of the forming chamber 15 at discrete locations along its length. Particularly in a short forming chamber, dams or weirs are mounted in the refractory bottom 57, and these extend across its width. These dams are preferably vertically movable and are held down at their ends at each side of the forming chamber. They are preferably constructed of material that is less dense than the molten metal in the forming chamber so that their vertical position may be varied upwardly or downwardly by controlled adjustment of their holddown devices at their ends.

The forming chamber 15 further comprises refractory side walls 61. These, along with the bottom refractory 57, the threshold 31 and the exit lip 59, define a container for holding a pool of molten metal.

The upper portion of the chamber further includes a lintel 63 at its upstream end. This lintel 63 may be used as a means for supporting delivery means roof 39. Additionally the upper portion of the chamber includes a ceiling or roof 65 preferably constructed of refractory material suitable for radiating or absorbing heat uniformly over the area facing the glass beneath it during operation. Extending through the ceiling of the forming chamber are controllable heating elements 67 used to control the rate of heat removal from the glass during forming. These heating elements are connected to bus bars (not shown) which are connected, in turn, to a source of power (not shown). The upper portion of the forming chamber 15, preferably includes a top casing end wall that extends over the glass removal or withdrawal facility 17 at the downstream end of the forming chamber 15. Disposed within the bottom container portion of the forming chamber is a pool of molten metal 69, preferably molten tin or an alloy of tin.

At the downstream end of the forming chamber is the glass removal facility 17 for withdrawing a continuous sheet of glass from the surface of the pool of molten metal 69 and for conveying a withdrawn sheet of glass from the forming chamber 15. The glass removal facility includes curtains 71 or other barriers or seals to segregate the headspace of the forming chamber from the outside environment. These are preferably flexible curtains of heat resistant cloth (e.g., asbestos) or the like. The glass removal facility further includes liftoff rolls 73 mounted in a position to lift and convey a glass sheet from the forming chamber. These rolls 73 are provided with seals 75, usually of graphite, to seal the bottom portion of the forming chamber from the outside environment.

When making flat glass using the apparatus described, a layer of molten glass 77 is delivered onto the molten metal 69 in the upstream end of the forming chamber. This glass is cooled and forces are imparted to the glass, for example, by the action of rolls 73. This causes the glass to advance along the surface of the pool of molten metal and to form a continuous sheet of glass that is dimensionally stable (that is, it assumes a stable thickness and width that is maintained as the glass is withdrawn from the forming chamber).

Extending into the forming chamber 15 near each side wall 61 is a steering device 81 comprising facilities for controlling or adjusting and maintaining particularly desired thermal conditions in the glass passing immediately beneath it. These devices 81 are conveniently termed "glass edge radiators" since their primary effect upon the marginal edge portions of glass passing beneath them is believed due to radiant heat transfer, although it is recognized that some convective heat transfer must also occur. The glass edge radiators are elongated along the intended path for glass advance through the forming chamber. Their long dimensions are preferably aligned with the chamber side walls when it is desired to maintain the width of the advancing glass relatively unchanged from delivery to withdrawal. Their long dimensions are preferably angled inwardly toward the center of the forming chamber with their downstream ends closer than their upstream ends when delivered glass is initially permitted to spread and the spread glass is then drawn down to a lesser width during forming. In any event, the radiators are aligned over the intended path for the marginal edges of an advancing layer of glass.

The radiators are preferably positioned a short distance downstream from the location of molten glass delivery to the forming chamber. When the delivered glass is initially permitted to spread, the radiators are preferably located just downstream of the location of maximum desired width of the advancing glass.

As may be seen in FIG. 2, the radiators 81 are supported over an advancing layer of glass in a forming chamber and are connected to conduits 83 which are preferably surrounded by thermal insulation 87 where they extend over exposed molten metal between the advancing glass and a chamber side wall 61. The conduits 83 are connected to a source of coolant (not shown). The conduits 83 may be connected to separate chambers in the radiator 81 and coolant (such as water) may be independently fed through separate conduits to such separate chambers to obtain particularly desired control of the glass temperature, such as crossover differential thermal control described above for highly responsive steering of an advancing layer of glass.

Figure 3:
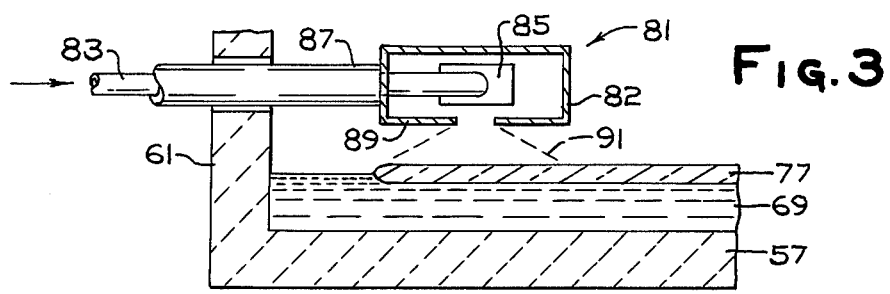
FIG. 3 is a partial sectional elevation view taken along section line 3—3 of FIG. 2 showing a suitable steering device or cooler for use in an apparatus for carrying out this invention.

Referring now to FIG. 3, there is seen in greater working detail a radiator according to this invention. The radiator 81 comprises an outer shell or enclosure 82 having an elongated slit for alignment with an intended path of advance for a marginal edge of an advancing layer of glass 77. Inside the shell 82 and connected to and in communication with the conduits 83 is a cooler 85. It is aligned with and faces the slit in the bottom of the shell 82. Surrounding the conduit 83 is a layer of thermal insulation 87 to shield the conduit 83 from the outboard or exposed molten metal 69 between the glass 77 and the side wall 61. The bottom, glass- and molten metal-facing surfaces 89 of the radiator shell are preferably highly reflective surfaces. A shell constructed of stainless steel can provide sufficiently reflective surfaces. The radiator 81 is spaced sufficiently from a furnace side wall so that a field of view 91 for the radiator cooler 85 through the slit in the shell 82 will generally intercept only the glass. Since the molten metal is much more reflective than molten glass with the glass having a much greater emissivity than the molten metal, radiant heat transfer is much more effective between the cooler 85 and the glass 77 than between the cooler 85 and the metal 69. Since the radiator is intended to steer as well as stabilize glass movement, it is understood that the field of view 91 will, from time to time, embrace some exposed molten metal. The radiator 81 acts as an excellent radiator (being an approximation of a black body radiator) for receiving heat from the glass. It may be moved inwardly and outwardly to affect more or less of the glass as a method of controlling the rate of heat transfer, or it may be provided with remotely adjustable bottom surfaces 89' to adjust the slit width in the manner of adjusting an aperture of a camera. It is also practical and sufficient when stabilization of advancing glass in a steady state operation is desired to merely control the rate at which coolant is directed to the cooler 85 through the conduits 83.

Figure 4:
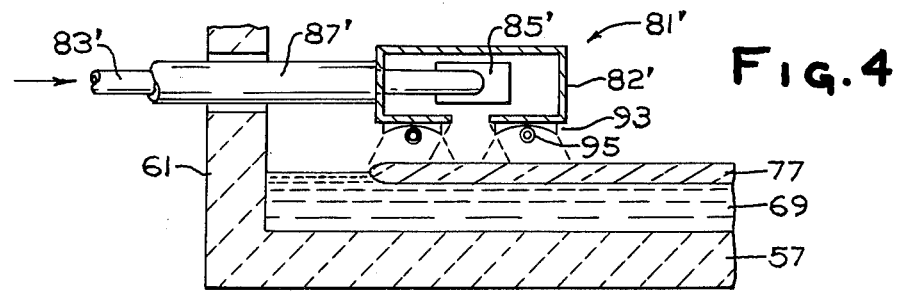
FIG. 4 is a partial sectional elevation view of an alternate steering device including a heater seen along a similar section line as FIG. 3.

For more sensitive temperature control of the glass and, thus, for more sensitive control of the path of advance of the glass, a radiator is provided with one or more controllable heaters. Such an embodiment of the invention is shown in FIG. 4. The radiator 81' is essentially the same as the radiator 81 shown in FIG. 3. It includes a shell 82', conduits 83' connected to a cooler 85' inside the shell 82' and thermal insulation 87' surrounding the conduits 83'. On the bottom face of the shell are mounted reflectors 93 with radiant heaters 95 mounted beneath them and facing the glass 77. The reflectors 93 are preferably focusing reflectors to direct the heat from the heaters 95 primarily toward the glass. The heaters 95 preferably comprise individually controllable segments along the length of the radiator 81'. Each segment is small enough to respond quickly to changes in power input. The heaters 95 are connected to an external source of electrical power (not shown).

Figure 5:
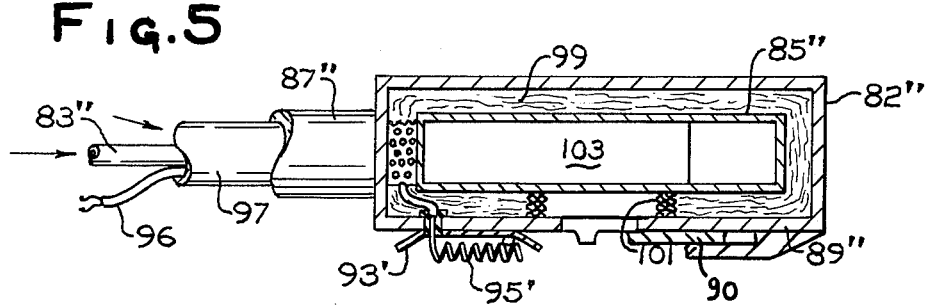
FIG. 5, like FIGS. 3 and 4, is a partial sectional elevation view of a steering device, showing in greater detail a preferred construction of the device.
Figure 6:
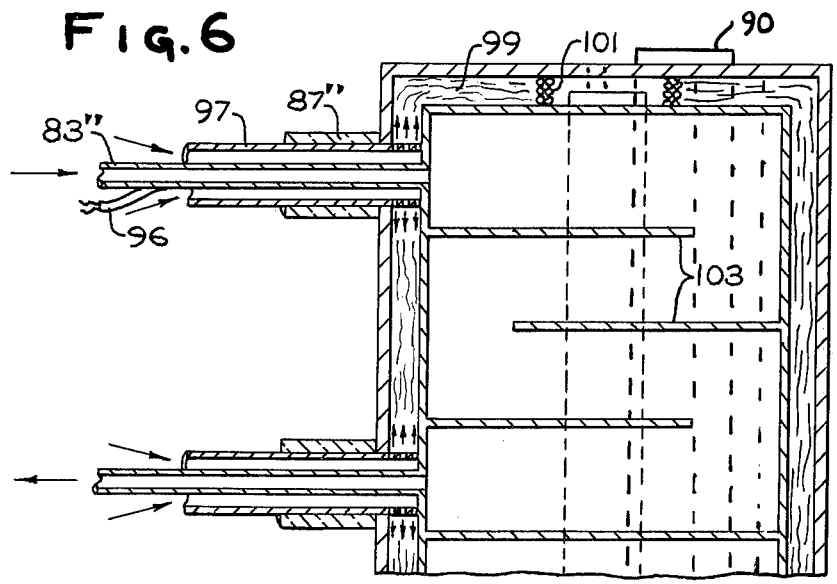
FIG. 6 is a partial sectional plan view of the steering device shown in FIG. 5 illustrating one controllable section of the device.

The preferred heater/cooler combination radiator is shown in greater detail in FIGS. 5 and 6. It includes, in addition to elements similar to those in the already described embodiments, a gas conduit 97 for directing a non-oxidizing, protective gas into the shell 82''. Such a gas purges the interior of the shell 82'' and the glass-facing surfaces 89'' of the shell as it flows out into the forming chamber head space through the slit in the bottom of the shell. In the illustrated embodiment of this invention, the gas conduits coaxially surround the coolant conduits 83'' providing an annular space between them for delivering the protective gas. The electric power cable 96, serving the heaters 95', is also placed in this annular space which is kept relatively cool due to the presence of the inner, coolant conduit. The outer, gas conduit is surrounded by thermal insulation 87''. The portion of the gas conduit extending between the shell 82'' and the cooler 85'' is provided with a plurality of orifices or apertures for distributing the protective gas into the space between the shell and the cooler. The space between the shell 82'' and the cooler 85'' is preferably filled with a thermal insulation 99 that permits the free passage of gases through it. This thermal insulation 99 may be a mat or packed loose fibers of mineral wool or the like. Screens 101 are mounted in the shell to prevent the thermal insulation 99 from separating from the enclosed space. The screens 101 and the conduits may be thermally isolated from the shell 82'' by providing thermally insulated gaskets between the shell and each of them, respectively. The cooler 85'' is provided with baffles 103 for distributing coolant and improving the efficiency of the cooler. A shutter 90 is provided to adjust the size of the slit in cooler face 89'' to adjust the cooling rate.

Figure 7:
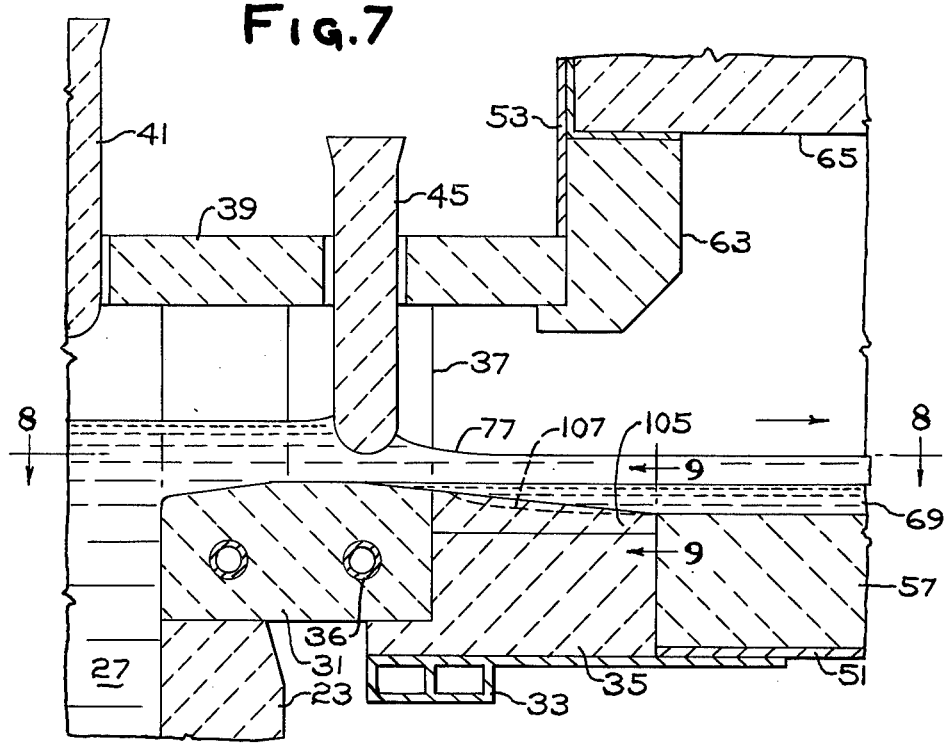
FIG. 7 is a partial sectional elevation view of the delivery facility and upstream end of the forming chamber shown in FIG. 1 illustrating the preferred forming chamber bottom.
Figure 8:
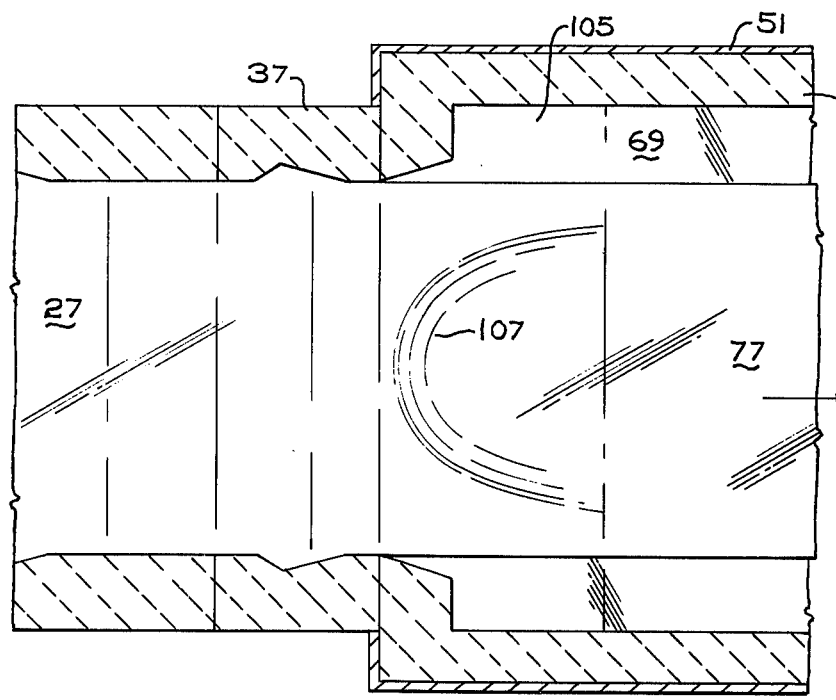
FIG. 8 is a partial sectional plan view of the delivery facility and upstream end of the forming chamber seen in FIG. 7 and taken along section line 8—8 of FIG. 7.
Figure 9:
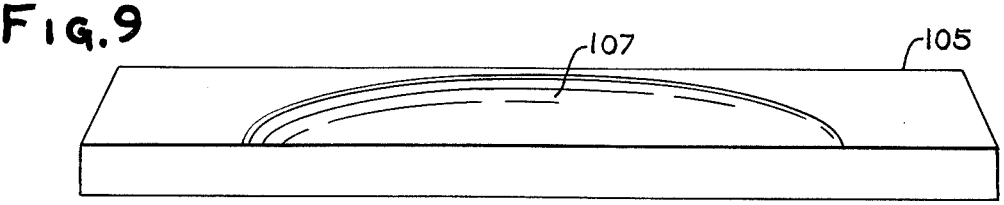
FIG. 9 is a partial sectional elevation of the bottom of the forming chamber taken along section line 9—9 of FIG. 7.

Referring now to FIGS. 7, 8 and 9, the details of the preferred bottom structure of a preferred forming chamber may be appreciated. The bottom seal portion 35 of the upstream end of a forming chamber is provided with a top portion 105 comprising a forming chamber entrance floor. This may be a separate refractory piece or may merely be the upper portion of the refractory bottom at that location.

The forming chamber entrance floor 105 generally slopes downwardly from its upstream end which is adjacent a threshold 31 in the preferred embodiment of this invention. This downward slope is apparent along the sides of the entrance floor 105 closest the side walls 61 of the forming chamber. In the central portion of the entrance floor 105 is a depression or scooped-out portion 107 providing for a greater depth of molten metal under the central portion of a delivered layer of glass 77 than under the marginal edge portions of a delivered layer of glass. In an apparatus wherein a layer of glass is delivered substantially horizontally onto the molten metal, the depression 107 in the entrance floor 105 preferably has the shape of a section of a paraboloid as shown in the drawings. Such a shape enhances development of a heat transfer pattern between delivered glass and the molten metal beneath it which preferentially cools the central portion of the glass and increases its viscosity relative to the viscosity of the glass in the marginal edge portions of the glass. This, in turn, provides a counteracting resistance to the otherwise favored velocity gradient in an advancing layer of molten glass.

When carrying out the method of glass manufacture using the described apparatus, a layer of molten glass (for example, soda-lime-silica glass) is delivered onto the surface of the molten metal in the forming chamber at a rate of about 40 tons per day ($36 \times 10^3$ kilograms per day). The average temperature of the delivered glass is about 2050°F. (1120°C). The glass is delivered as a layer having a depth of one-half inch (1.27 cm) and a width of 6 feet (1.83 meter). The chamber has an entrance floor extending 6 feet (1.83 meter) from a threshold. A molten metal depth of one-half inch (1.27 cm) is provided at the upstream end of the entrance floor and a depth of 2.5 inches (7.6 cm) is provided at the downstream end of the entrance floor. This depth is maintained for 6 feet (1.87 meter) farther downstream in the chamber; thereafter the bottom provides for a metal depth of two inches (5.1 cm). The depression in the entrance section begins about 6 inches (15.3 cm) from the threshold; its width at the downstream end of the entrance floor is about 5 feet (1.52 meter); and it is approximately parabolic.

Radiators, each having a length of 6 feet (1.87 meter) and each having two separately controllable sections of equal length, are mounted in the chamber extending from about 6 feet (1.87 meter) to about 12 feet (3.64 meters) downstream from the threshold. The radiators are of the design shown in FIGS. 5 and 6. The radiators are initially cooled to only a limited and equal extent simply to maintain them at a temperature to prevent warping.

The advancing glass is observed for an extended time and it remains in a path aligned along the center of the forming chamber. This is in contrast to the drift commonly experienced in operating forming chambers of the kind where glass is poured onto molten metal and allowed to spread before forming.

A rod is inserted into the forming chamber through the right side wall about 6 feet (1.87 meter) from the threshold, and the glass is pushed about 6 inches (15.3 cm) toward the left side wall. The glass is observed and in about 15 minutes the glass has almost returned to its original alignment; within 30 minutes its path appears to be in perfect alignment with the forming chamber. This realignment is accomplished without resort to use of the steering radiators.

The glass is again pushed out of alignment as before. The downstream section of the left radiator is operated at a lower temperature than its upstream section, while the downstream section of the right radiator is operated at a higher temperature than its upstream section. The average left and right temperatures of the radiators are maintained about the same, while the average upstream-to-downstream, (or vice versa) temperature differences are about 20°F. (11.1°C). Within about 5 minutes the advancing glass appears to be perfectly aligned once again.

During the operation nitrogen is fed to the radiators although a mixture of nitrogen and hydrogen may be used.

Although this invention has been described with reference to particular embodiments of it which are illustrated here, those skilled in the art of glassmaking will appreciate that the specific embodiments described may be modified without departing from the spirit or scope of this invention.

I claim:

1. In a process for making flat glass wherein molten glass is delivered onto the surface of a pool of molten metal in an enclosed forming chamber having a bottom, an upstream inlet end, a downstream outlet end, and a roof and side walls extending from the upstream end to the downstream end of the chamber and providing an enclosed space between them and beneath the roof; advancing the glass along the surface of the pool of molten metal from the upstream end toward the downstream end of the chamber; cooling the advancing glass to form a dimensionally stable, continuous sheet of glass therefrom; and removing the continuous sheet of glass from the forming chamber, wherein the advancing glass has tendency to drift from a direct path of advance; the improvement comprising selectively adjusting and maintaining the temperature of at least one marginal edge portion of the advancing glass to maintain the advancing glass in a preselected path by controlling the transfer of heat between the marginal edge portion of the glass and a radiant cooler, wherein such control is achieved by partially shielding the cooler from the glass by a heat reflective enclosure having an elongated aperture facing a marginal edge portion of the advancing glass and substantially aligned with its edge.

2. The method according to claim 1 wherein the temperature of each marginal edge portion of the glass is adjusted and maintained at least at a location spaced downstream sufficiently from the upstream end of the chamber to provide for the development of an advancing layer of freely flowable glass of substantially uniform transverse thickness between the upstream end of the chamber and the location and sufficiently close to the upstream end of the chamber so that the affected glass has not yet reached dimensional stability.

3. The method according to claim 2 wherein the width of the glass is decreased as it is formed and the temperature of each marginal edge portion of the glass is adjusted and maintained at least as the width of the advancing glass is decreasing.

4. The method according to claim 2 wherein the temperature of each marginal edge portion of the glass is adjusted and maintained at least two locations respectively spaced a first distance and a second, greater distance downstream from the upstream end of the chamber, wherein the second location that is spaced a greater distance downstream from the upstream end of the chamber is sufficiently spaced therefrom to provide for the development of the advancing layer of freely flowable glass between the upstream end of the chamber and the second location of glass temperature adjustment and maintenance.

5. The method according to claim 4 wherein the glass of one marginal edge portion is cooled more at its first location than at its second location while the glass of the other marginal edge portion is cooled more at its second location than at its first location.

6. The method according to claim 1 wherein the marginal edge portions of the glass are supported by molten metal having lesser depth than that supporting the central portion of the glass as the glass is advanced from its location of delivery at the upstream end of the chamber to a location for said selective adjustment and maintenance of the temperature of each marginal edge portion of the advancing glass.

7. The method according to claim 6 wherein the glass is delivered along a substantially horizontal path onto the pool of molten metal and wherein the depth of molten metal supporting the central portion of the glass has a depth that is maintained to vary with respect to distance from the upstream end of the chamber and with respect to distance from the centerline of the chamber extending from the upstream end of the chamber to the downstream end midway between its side walls.

8. The method according to claim 7 wherein the depth of the molten metal beneath the central portion of the advancing glass substantially immediately following its delivery is such that the molten metal in that central portion is maintained as a truncated paraboloid having its truncated section as a plane substantially parallel to the glass supporting surface of the molten metal and its apex facing the upstream end of the forming chamber.

9. In an apparatus for making flat glass comprising a forming chamber; means for delivering a layer of molten glass to the forming chamber; and means for removing a formed continuous sheet of flat glass from the forming chamber; wherein the forming chamber includes a bottom, an upstream end adjacent the molten glass delivery means, a downstream end adjacent the glass sheet removal means, side walls extending from the upstream end to the downstream end and upwardly from the bottom and a roof extending between the side walls and between the upstream and downstream ends providing an enclosed space, the enclosed space containing a pool of molten metal on the bottom for receiving and supporting glass delivered thereto and a headspace overlying the pool of molten metal; means for advancing glass along the surface of the pool of molten metal; and means for cooling the glass during its advance for forming it into a continuous sheet; the improvement comprising a pair of radiators disposed in the headspace of the chamber, one radiator spaced inwardly from each side wall to overlie a marginal edge portion of an advancing layer of glass, each being individually controllable for separately adjusting and maintaining the temperature of the marginal edge portion of the glass it overlies, said radiators being spaced sufficiently from the upstream end of the chamber to provide for the development of an advancing layer of glass between them and the upstream end of the chamber and spaced sufficiently close to the upstream end of the chamber for overlying the glass before it is cooled sufficiently to reach dimensional stability, wherein each of said radiators comprises a cooler within an enclosure having a surface providing an aperture for facing a marginal edge portion of an advancing layer of glass.

10. The apparatus according to claim 9 wherein each of said radiators is elongated having a long dimension defining its length and a short dimension defining its width and each is disposed within the chamber so that its long dimension lies in a line extending from the upstream end to the downstream end of the chamber.

11. The apparatus according to claim 10 wherein each of said radiators is disposed within the chamber so that its long dimension is substantially aligned with a centerline joining the upstream and downstream ends of the chamber at their mid-points.

12. The apparatus according to claim 9 wherein each of said enclosures has a surface providing an elongated aperture having a long dimension and a short dimension and wherein said radiator is disposed within the chamber so that the aperture faces a marginal edge portion of an advancing layer of glass with its long dimension substantially aligned with an intended path of advance for the edge of the advancing layer of glass.

13. The apparatus according to claim 12 wherein the surface providing the aperture is a heat reflecting surface.

14. The apparatus according to claim 9 wherein each of said radiators further comprises a heater mounted thereon for facing a marginal edge portion of an advancing layer of glass.

15. The apparatus according to claim 14 wherein said heater is an electric heater.

16. The apparatus according to claim 9 wherein each of said radiators comprises a plurality of individually controllable sections along its length.

17. The apparatus according to claim 9 wherein each of said radiators further comprises means for directing a gas through its enclosure.

18. The apparatus according to claim 9 wherein each of said radiators further includes thermal insulation at least partially surrounding said cooler separating it from its enclosure.

19. The apparatus according to claim 9 wherein the bottom of the chamber in a region adjacent the upstream end of the chamber provides for a greater depth of molten metal in a central portion of the chamber than along the bottom adjacent the side walls of the chamber.

20. The apparatus according to claim 19 wherein the region of the bottom of the chamber providing for a greater depth of molten metal in the central portion of the chamber at least partially underlies said radiators.

21. A radiator for use in a glass forming chamber, wherein glass is supported on and advanced along a pool of molten metal for forming the glass into a continuous sheet of flat glass, comprising
 a. a shell including a face with a glass facing surface having an elongated opening therein;
 b. a cooler disposed within said shell and facing the opening of the glass facing face thereof and providing a space between said cooler and said shell;
 c. coolant conduits connected to said cooler through said shell; and
 d. means for supporting said shell and said cooler in a glass forming chamber over a marginal edge portion of advancing glass contained therein and for aligning the elongated opening substantially along a desired path of advance for the marginal edge portion of the glass.

22. The radiator according to claim 21 wherein the glass facing surface of said shell is a heat reflecting surface.

23. The radiator according to claim 21 wherein said coolant conduits are thermally insulated adjacent said shell.

24. The radiator according to claim 21 wherein thermal insulation is disposed in at least a portion of the space between said cooler and said shell.

25. The radiation according to claim 21 further comprising a heater mounted on said shell for facing advancing glass in a glass forming chamber.

26. The radiator according to claim 21 further comprising means for directing a protective gas into the space between said cooler and said shell.

* * * * *